(12) United States Patent
Svensson (10) Patent No.: US 11,029,234 B2
(45) Date of Patent: Jun. 8, 2021

(54) METHOD FOR TESTING INTERACTION POINTS OF VEHICLE COMPONENTS BY MEANS OF A VEHICLE TEST APPARATUS AND SUCH TEST APPARATUS

(71) Applicant: Volvo Truck Corporation, Gothenburg (SE)

(72) Inventor: Magnus Svensson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/049,948

(22) PCT Filed: Apr. 23, 2018

(86) PCT No.: PCT/EP2018/060345
§ 371 (c)(1),
(2) Date: Oct. 22, 2020

(87) PCT Pub. No.: WO2019/206394
PCT Pub. Date: Oct. 31, 2019

(65) Prior Publication Data
US 2021/0088413 A1   Mar. 25, 2021

(51) Int. Cl.
| G01M 17/007 | (2006.01) |
| G01M 17/04 | (2006.01) |
| G01M 5/00 | (2006.01) |

(52) U.S. Cl.
CPC ...... *G01M 17/0074* (2013.01); *G01M 5/0075* (2013.01); *G01M 17/04* (2013.01)

(58) Field of Classification Search
CPC .. G01M 17/0074; G01M 17/04; G01M 17/06; G01M 5/0075
(Continued)

(56) References Cited

U.S. PATENT DOCUMENTS

| 6,691,062 B1* | 2/2004 | Nobis ..................... G01B 11/14 |
| | | 356/139.09 |
| 9,290,184 B1* | 3/2016 | Diel ....................... G01M 17/02 |
| 2007/0118258 A1* | 5/2007 | Probst ................... G01M 17/04 |
| | | 701/31.4 |

FOREIGN PATENT DOCUMENTS

| DE | 10212255 A1 | 10/2003 |
| DE | 102016008031 A1 | 2/2017 |

(Continued)

OTHER PUBLICATIONS

International Search Report and Written Opinion for PCT/EP2018/060345, dated Jan. 28, 2019, 13 pages.
(Continued)

*Primary Examiner* — Eric S. McCall
*Assistant Examiner* — Timothy P Graves
(74) *Attorney, Agent, or Firm* — Withrow & Terranova PLLC (57) ABSTRACT

The invention relates to a method for testing an interaction point of vehicle components such as bushings or joints by means of a vehicle test apparatus (1), wherein the vehicle test apparatus (1) comprises a test apparatus control unit (2), at least one vehicle wheel support (3) movable in a horizontal plane, and means for monitoring (4) bushings or joints. The vehicle wheel support (3) and the means for monitoring (4) are controllable by means of the test apparatus control unit (2). The method comprises the step of: determining interaction point of vehicle components such as bushing or joints to be tested, and the following steps performed by means of the test apparatus control unit (2); selecting testing sequence based on determined interaction point of vehicle components such as bushing or joint to be tested, controlling movement of the vehicle wheel support (3) in at least a first direction in the horizontal plane according to the selected testing sequence, monitoring inter- (Continued)

action point of vehicle components such as bushing or joint behaviour by means of the means for monitoring (4), and collecting measurement data from the means for monitoring (4). The invention also relates to a vehicle test apparatus (1) configured to executed the method of the invention.

19 Claims, 5 Drawing Sheets

(58) Field of Classification Search
USPC .......................................... 73/115.01–118.01
See application file for complete search history.

(56) References Cited

FOREIGN PATENT DOCUMENTS

| EP | 2159561 A2 | 3/2010 |
|---|---|---|
| WO | 98/22790 A1 | 5/1998 |
| WO | 2015/092594 A2 | 6/2015 |

OTHER PUBLICATIONS

International Preliminary Report on Patentability for PCT/EP2018/060345, dated Jul. 21, 2020, 16 pages.

* cited by examiner

METHOD FOR TESTING INTERACTION POINTS OF VEHICLE COMPONENTS BY MEANS OF A VEHICLE TEST APPARATUS AND SUCH TEST APPARATUS

This application is a 35 USC 371 national phase filing of International Application No. PCT/EP2018/060345, filed Apr. 23, 2018, the disclosure of which is incorporated herein by reference in its entirety.

TECHNICAL FIELD

The invention relates to a method for testing interaction points of vehicle components such as for example bushings or joints by means of a vehicle test apparatus. The invention may for example be applied in order to assess and identify need of maintenance of bushings or joints of heavy-duty vehicles, such as trucks, buses and construction equipment. Although the invention will be described with respect to a truck, the invention is not restricted to heavy-duty vehicles but may also be used in other vehicles such as for example passenger cars.

The invention also relates to a vehicle test apparatus for executing the method of the invention and to a computer program comprising program code means, to a computer readable medium carrying such a computer program and to a control unit.

BACKGROUND

During operation of vehicles in general, and heavy-duty vehicles in particular, various joints and various types of bushings such as for example journal bearings or ball bearings, herein referred to simply as bushings or joints, are constantly exposed to wear. Heavy wear of a bushing or joint results in play between interacting components. Such play may in turn result in increased vibrations and shaking which degrades the bushings or joints even more. Play and worn bushings or joints affects the driveability, fuel consumption of the vehicle and safety aspects.

In order to test the condition of bushings or joints of a vehicle at least the front wheels of the vehicle are placed on movable shake plates. By manually controlling movements of the shake-plates and visually monitoring the behaviour of respective bushing the condition of the bushing or joint is assessed. Since both controlling movements of the shake-plates and visually assessing the condition of respective bushing or joint is done by a shake-plate operator the assessment is fairly arbitrary.

Thus there is a need for improvement.

SUMMARY

An object of the invention is to provide improved controllability of vehicle testing using a vehicle test apparatus and a method of controlling such vehicle test apparatus. Yet an object of the invention is to provide a less arbitrary assessment of the behaviour of interaction points of vehicle components such as for example bushings or joints.

According to a first aspect of the invention the object is achieved by a method according to the independent method claim. According to a second aspect of the invention the object is achieved by a test apparatus according to the independent apparatus claim relating to a vehicle test apparatus for executing the method of the invention.

Further advantages and advantageous features of the invention are disclosed in the following description and in the dependent claims.

Other objects of the invention are to provide a computer program comprising program code means configured to execute the method of the invention, a computer readable medium carrying such a computer program and a control unit for controlling the method of the invention.

During operation, i.e. driving of a vehicle, vehicle components are exposed to vibrations of various frequencies and amplitudes. Over time vibrations expose all interaction points of the vehicle to stress. Interaction point is herein defined as either a point where two components of a vehicle are directly attached to each other, such as for example the point where a bar is bolted or welded to a vehicle frame, or a point where two vehicle components are arranged to each other by means of an intermediate component, such as for example connections where bushings or bearings are used. In the following disclosure a number of exemplary vehicle component interaction points are disclosed. The stress interacting components are exposed to may result in wear of components or in that vehicle components become loose in relation to each other.

In order to identify wear of an interaction point, i.e. the play that ultimately is the result of the wear, or that an interaction point becomes less rigid, moveable plates can be used. By manually controlling the movements of the plates and visually monitoring the behaviour of a particular interaction point, such as for example the behaviour of a specific bushing or joint, the condition of that bushing or joint can be assessed. This is however an arbitrary assessment, to large extent depending on the operator making the assessment. For certain vehicle components, such as for example bushings or joints, play may be hard to detect by the human eye. By manually controlling the movements of the plates there is an imminent risk that the testing sequence used is insufficient, i.e. do not reveal potential play, not reproducible and/or that linkages, wheel suspensions etc. may get damaged during testing. Wear of a particular vehicle component may also be the result of incorrect positioning or incorrect mounting of the vehicle component.

According to a first, most general aspect of the invention the invention refers to a method for testing the behaviour of an interaction point of vehicle components by means of a vehicle test apparatus, wherein the vehicle test apparatus comprises:

a test apparatus control unit,
a vehicle wheel support movable in a horizontal plane, and
means for monitoring, wherein the vehicle wheel support and the means for monitoring are controllable by means of the test apparatus control unit,
wherein the method comprises the steps of:
manually or automatically determining interaction point of vehicle components to be tested,
and the following steps performed by means of the test apparatus control unit:
selecting testing sequence based on determined interaction point of vehicle components to be tested,
controlling movement of the vehicle wheel support in at least a first direction in the horizontal plane according to the selected testing sequence,
monitoring the behaviour of the interaction points of vehicle components point by means of the means for monitoring, and collecting measurement data from the means for monitoring.

The testing sequence is selected based on which interaction points of vehicle components that it is determined should be tested. The selected testing sequence is designed specifically to expose for example wear, play, incorrect positioning, degree of resilience or other uncharacteristic or unwanted behaviour of the interaction points of vehicle components to be tested.

An exemplary, general advantage with this aspect of the invention is that for interaction points of vehicle components to be tested it can be guaranteed that that specific interaction point is exposed to a testing program which is adapted to expose defects or uncharacteristic behaviour of that specific interaction point. A further exemplary advantage is that the selected testing sequence guarantees that the vehicle, or any component thereof, is not exposed to forces that may be damaging given the current vehicle configuration and disposition.

Note that according to the invention determining interaction point of vehicle components to be tested can be done either manually or automatically but that the following steps of selecting testing sequence, controlling movements of the vehicle wheel supports, monitoring the behaviour of interaction points and collecting measurement data are executed automatically by means of, and under control of, the control unit whereby the latter steps are not performed under the influence of human arbitrariness.

An example of a suitable means for monitoring is a video recording device, whereby the behaviour of an interaction point of vehicle components can be recorded during execution of the selected testing sequence. The recording may subsequently be reviewed and may be processed to detect uncharacteristic behaviour or play not detectable by the human eye. However, as is discussed more in detail below, also other means for monitoring are feasible.

Uncharacteristic or unwanted behaviour may for example be that two adjacent components which are intended to be fixed in relation to each other moves in relation to each other when the wheels of the vehicle to is exposed to horizontal movements according to a predetermined testing sequence. Thus, the present invention may be applied to test that various vehicle components, interacting at an interaction point, are fixed in relation to each other. Components interacting at an interaction point which are intended to have some degree of freedom to move disclose a characteristic behaviour for example when being exposed to horizontal movements according to a predetermined testing sequence. Reference data concerning such characteristic behaviour may for example be provided by a component or vehicle manufacturer and/or accessed and retrieved from a vehicle reference database. Such vehicle reference database may be, or may be connected to, a cloud based reference database. Reference data concerning characteristic behaviour of various interaction points and/or components may also be collected by previously executed benchmarking operations providing reference data which may be stored in a vehicle reference database. By comparing such characteristic data with measurement data collected by the means for monitoring according to the invention uncharacteristic or unwanted behaviour can be detected. The means for monitoring may be, but is not limited to be, the same sensors used when collecting reference data concerning characteristic behaviour. What is important is that the reference data concerning characteristic behaviour can be compared to measurement data collected and that conclusions regarding characteristic and uncharacteristic behaviour can be drawn therefrom. The present invention may also be applied to test if a component is correctly mounted. Incorrectly mounted components may for example move in a way respective component is not supposed to move or move more than respective component is supposed to. That various components are fixed in relation to each other and/or correctly mounted is something that is controlled at reoccurring vehicle maintenance service.

As previously mentioned, another important property to monitor when testing behaviour of an interaction point of vehicle components point is play. Thus, according to a first embodiment of the invention the behaviour of the interaction point is monitored by monitoring play at the determined interaction point. Play may be an indication of that for example a joint is worn and have to be replaced.

Examples of interaction points of vehicle components for which the behaviour may be advantageous to monitor are engine bearers supporting the engine, the engine suspension upholding the engine or the leaf spring retainer packs holding the leaf springs of truck suspensions together.

Generally, resilient dampers of a vehicle are advantageous to monitor the behaviour of, and the resilient dampers of the engine bearers are examples thereof. Naturally it is important that the engine is positioned as intended and the condition and behaviour of the engine bearers strongly affects the positioning of the engine. By exposing the wheels of a vehicle to horizontal movements according to a predetermined testing sequence by means of vehicle wheel supports it is possible to test, monitor and collect data regarding if various resilient dampers, such as for example the resilient dampers of the engine bearers, behaves in a characteristic or uncharacteristic manner. If they behave in an uncharacteristic manner this may be an indication of that they need to be attended to.

The engine suspension also affects the positioning of the engine even if the primary object of the engine suspension is to reduce vibrations transferred from the engine to the rest of the vehicle. In order for the engine suspension to work properly the engine suspension cannot be too soft-neither too hard. The behaviour of an engine suspension may also be monitored by exposing the wheels of a vehicle to horizontal movements according to a predetermined testing sequence by means of vehicle wheel supports, whereby if the engine suspension behaves in a characteristic or uncharacteristic manner can be assessed.

In order for a suspension of a heavy-duty vehicle to function satisfactorily it is important that the leaf spring retainer packs, comprising the leaf springs of the suspension and holding the leaf springs together, are tightly arranged. By exposing the wheels of a heavy-duty vehicle to horizontal movements according to a predetermined testing sequence by means of vehicle wheel supports it is possible to test, monitor and collect data regarding if there is any play in respective leaf spring retainer pack.

Bushings and joints are other examples of interaction points of vehicle components for which the method of the invention may be applied in order to be able to provide a less arbitrary assessment of the behaviour of respective interaction point. Hereinafter bushing and/or joints are used as exemplary interaction points when various embodiments of the invention is disclosed.

Thus, one embodiment of the invention refers to a method for testing bushings or joints, by means of a vehicle test apparatus, wherein the vehicle test apparatus comprises:
- a test apparatus control unit,
- a vehicle wheel support movable in a horizontal plane, and
- means for monitoring bushings or joints,
- wherein the vehicle wheel support and the means for monitoring are controllable by means of the test apparatus control unit.

The method comprises the steps of:
- manually or automatically determining bushing to be tested, and the following steps performed by means of the test apparatus control unit:
- selecting testing sequence based on determined bushing or joint to be tested,
- controlling movement of the vehicle wheel supports in at least a first direction in the horizontal plane according to the selected testing sequence,
- monitoring bushing or joint behaviour by means of the means for monitoring, and
- collecting measurement data from the means for monitoring.

In line with the more general embodiment of the invention disclosed above, an exemplary advantage with this embodiment of the method of the invention is that it can be guaranteed that respective bushing or joint is exposed to a testing program which is adapted to expose defects of that specific bushing or joint. A further exemplary advantage is that the selected testing sequence guarantees that the vehicle, or any component thereof, is not exposed to forces that may be damaging given the current vehicle configuration and disposition.

The method for evaluating bushings or joints is executed by means of a vehicle test apparatus exposing the wheel of the vehicle, and thereby components arranged in connection thereto, to forces acting in the horizontal plane. Horizontal plane is here defined in relation to the vehicle test apparatus. The vehicle test apparatus comprises a test apparatus control unit, vehicle wheel supports movable in a horizontal plane, and means for monitoring bushings.

When a bushing of a vehicle should be tested using the test apparatus at least one wheel of the vehicle is placed on the vehicle wheel supports. As will be discussed more in detail later on, preferably more than one vehicle wheel support is used whereby more than one wheel of the vehicle can be placed on the vehicle wheel supports. The vehicle wheel supports and the means for monitoring are controllable by means of the test apparatus control unit. The test apparatus is provided with information regarding which testing sequence that should be executed by the test apparatus control unit. What testing sequence that should be executed may be based on for example vehicle model and which vehicle bushing or joint that should be tested. As also will be explained more in detail below, the step of determining bushing or joint to be tested may either be performed by that a test apparatus operator manually selects or enters required information or by an at least partially automated process.

By moving the vehicle wheel support or supports while using the means for monitoring the behaviour of bushings or joints can be monitored and subsequently evaluated. Information of the testing sequence is provided from the test apparatus control unit to the vehicle wheel support or supports whereby the testing sequence is initiated. When the testing sequence is initiated the means for monitoring are activated by the test apparatus control unit. The means for monitoring may for example be a video recording device and during the testing sequence the means for monitoring collects measurement data, for example a video recording, of the behaviour of the bushing or joint that is tested. The collected measurement data is provided to the test apparatus control unit where the data is evaluated. The functionality of the vehicle test apparatus will be explained more in detail below.

The vehicle test apparatus further comprises means for communication. The means for communication provides information regarding selected testing sequence from the test apparatus control unit to the vehicle wheel supports. The means for communication also provides information regarding when monitoring should be initiated from the test apparatus control unit to the means for monitoring. The means for communication also provides data collected by the means for monitoring to the test apparatus control unit.

The vehicle test apparatus may be used during reoccurring vehicle maintenance services or during periodic vehicle inspection. In addition to the inspections considered necessary by the user of a heavy-duty vehicle, which for example may be dependent on the application of the vehicle, in almost every country national legislation demands inspection of heavy-duty vehicles at predetermined intervals. In many cases also which bushings or joints that needs to be inspected is governed by such legislation.

According to yet an embodiment of the invention method further comprises the method step of:
- evaluating collected measurement data.

By evaluating collected measurement data using a vehicle test apparatus for testing interaction points of vehicle components it is possible to give better and more reliable advice and recommendations regarding when and if a determined interaction point needs to be attended to. This embodiment of the invention is for example advantageous when applied for interaction points in form of bushings or joints.

The evaluation of collected measurement data can be performed either manually, thus either by that a test apparatus operator assesses the collected measurement data, or, as will be disclosed more in detail below, by that the collected measurement data is evaluated at least partially automatically by means of the test apparatus control unit. As also will be disclosed more in detail below, the collected data may come from at least one of various types of sensors such as for example a video recording device, a vibration sensor or a wheel alignment sensor. Depending on which sensor, or combination of sensors, that is used the measurement data collected and evaluated differs significantly, and different methods of evaluating the data need to be applied. Measurement data from a video recording device, i.e. a recorded video sequence, may for example be evaluated using picture pattern recognition technology whereas measurement data from a vibration sensor may be evaluated by comparing to reference data or to threshold values. Independently of which sensors that are used, if the evaluation is done manually or automatically and which method that is used to evaluate the measurement data the overall object is essentially the same; to in a less arbitrary way determine the condition of the bushing or joint and take action therefrom.

The primary objects of the method of the invention are to monitor, collect data and evaluate data concerning interaction points of vehicle components, for example bushings or certain types of joints. The method is particularly suitable for monitoring and evaluating joints disclosing similar properties as bushings, such as for example joints comprising bushings. For the sake of simplicity, herein we will primarily refer to interaction points in the form of bushings or joints, and we will describe the invention in relation to bushings and joint, but it is considered that methods and vehicle test apparatuses disclosed herein also may be used to evaluate other interaction points of vehicle components.

According to one embodiment of the invention the vehicle test apparatus comprises two vehicle wheel supports whereby the method comprises the method step of:
  controlling movements of the vehicle wheel supports in at least a first direction in the horizontal plane according to the selected testing sequence.

Using two vehicle wheel supports has the advantage that not only one wheel of the vehicle being tested may be moved, preferably one of the front wheels, but that both front wheels can be moved. Being able to control movements of both front wheels provides a better control of the forces that the vehicle and wheel suspension is exposed to and enables the front wheels of the vehicle to be moved in ways in relation to each other not possible by only moving one wheel. Being able to move not only one but both front wheels may enable specific bushings or joints to be tested which otherwise cannot be tested. Using two vehicle wheel supports also enables that the front wheels of the vehicle can be moved synchronously, but as will be discussed more in detail later on, according to embodiments of the invention the vehicle wheel supports can also be moved individually.

When herein referring to that at least one wheel, preferably two wheels, are arranged on the vehicle wheel supports what generally is referred to is that these wheels are the front wheels of a vehicle. However, as is apparent for a person skilled in the art the invention works in the same way if instead the most rear pair of wheels are arranged on the vehicle wheel supports.

According to other embodiments of the invention the vehicle test apparatus comprises more than two vehicle wheel support, preferably one vehicle wheel support for each wheel of the vehicle being tested. This enables that the vehicle and the wheel suspension of the vehicle can be exposed to even more complex and elaborated testing sequences.

According to another embodiment the method comprises the steps of:
  evaluating collected measurement data,
  accessing a vehicle reference database comprising stored data, and
  comparing collected measurement data with stored data from the vehicle reference database.

According to one embodiment, the method step comprises the steps of:
  evaluating collected measurement data, and
  manually or automatically determining if an interaction point of vehicle components, such as for example bushing or joint, fulfils vehicle requirements.

According to yet one embodiment, the method comprises the steps of:
  evaluating collected measurement data, and
  manually or automatically determining if an interaction point of vehicle components needs to be attended to, for example if a bushing or joint needs to be replaced.

Comparing measurement data collected from the means for monitoring with stored data from a vehicle reference database enables improved evaluation, for example by making the evaluation step less arbitrary. This also enables the evaluation step to be automatized. Determining if a vehicle bushing or joint fulfils a vehicle requirement, wherein the requirement may be retrieved from the vehicle reference database, is as step that is particularly suitable for being automated, even if it also may be performed by a vehicle test apparatus operator. If the requirement is not fulfilled it may be recommended to replace or repair the bushing or joint.

The vehicle reference database may for example also comprise reference data concerning characteristic behaviour of components interacting at an interaction point which are intended to have some degree of freedom to move in relation to each other. By comparing such stored reference data with measurement data collected by the means for monitoring it may be assessed and evaluated whether an interaction point behaves in a characteristic or uncharacteristic manner. The vehicle reference database may be, or may be connected to, a cloud based reference database. The reference data of a vehicle reference database may for example be obtained from a vehicle or component manufacturer or from benchmarking. The reference data may be, but is not limited to be, obtained by using same sensors as may be used as means for monitoring, such as for example by using a video recording device.

According to another embodiment, the step of determining bushing or joint to be tested comprises the steps of:
  accessing a vehicle reference database comprising stored data connected to vehicle information,
  inputting vehicle information, and
  retrieving stored data based on inputted vehicle information.

According to this embodiment of the invention which bushing or joint that should be tested is determined by the vehicle information inputted. In addition to that which bushing or joint of a vehicle that is required to be tested is controlled by legislation, which bushing that needs to be tested may be determined based on a number of parameters singly or in combination. It may for example be particularly important to test specific bushings or joints for a specific vehicle model. Weight of the specific vehicle or mileage of the specific vehicle are also parameters that may affect which busing or joint that should be tested. By intended design or experience gained over many years it may for example be known that once a specific mileage is reached for a specific vehicle model it is recommended that specific bushings are tested since there is an imminent risk that they are heavily worn and need to be replaced. The application of a specific vehicle, i.e. the intended use of a specific vehicle and the actual use of a specific vehicle, may also affect which bushing or joint that needs to be tested and also what play, i.e. degree of wear, that is acceptable. For a heavy-duty truck used in mines a larger play may for example be acceptable than for a light weight truck operating in inner city environments. It is also possible to tailor which bushings that should be tested at a particular time for a specific vehicle individual. It may for example be so that a specific vehicle individual of some reason is more prone to wear of a specific bushing than other vehicle individuals of the same vehicle model.

An advantage with this embodiment of the method is that it is possible to fingerpick the specific bushings or joints that need to be tested, possibly since they are the bushings or joints probably most worn at that specific moment, and that testing of other bushings may be postponed. This may for example save time at a reoccurring vehicle maintenance service.

The vehicle reference database referred to herein as comprising stored data may be, but is not limited to be, the same vehicle reference database referred to herein as comprising stored data connected to vehicle information and/or the vehicle reference database referred to herein as comprising reference data regarding characteristic and uncharacteristic behaviour of an interaction point and/or vehicle component. Vehicle reference databases may be obtained from various sources, such as from the vehicle or component manufacturer, by benchmarking or can be compiled according to various other methods.

The vehicle information inputted can be inputted either manually of automatically. Thus, according one embodiment of the invention, the step of inputting vehicle information is performed either by:
- automatically detecting vehicle model and/or vehicle weight and/or vehicle individual and/or mileage of a vehicle and/or vehicle application of the vehicle for which the interaction point of vehicle components is to be tested, or
- manually inputting vehicle information.

This embodiment of the invention is for example advantageous when applied for interaction points of vehicle components in form of bushings or joints.

Automatic detection and inputting of vehicle information used to determine which bushings or joints that needs to be tested, and consequently by means of which testing sequence that bushing should be tested, has the advantage that no manual labour is required. The automatic vehicle detection may for example be based on automatic, visual vehicle plate reading or information transmitted by, or requested from, the vehicle control unit, for example by means of a Wi-Fi connection. Weight of the vehicle may be measured by having a weighing machine integrated in the vehicle wheel supports.

The specific testing sequence required in order to be able to detect play, degree of wear, potential damage or possible breakdown of a specific bushing or joint is first and foremost dependent on type of bushing or joint; if it for example is a plain bearing bushing, a bushing of a ball joint or a journal bearing bushing, and the position of the bushing or joint; if it for example is a bushing of the steering linkage or a bushing of the wheel suspension. A testing sequence of a specific bushing is designed to expose that bushing, and/or the linkage of that bushing, to loads or forces defined in direction, magnitude and length of stroke which are sufficient for revealing the play due to wear. The same applies for testing of a joint. Hence, according to another embodiment of the invention, the step of selecting testing sequence based on determined bushing or joint to be tested further comprises the step of:
- determining type of bushing or joint and/or position of bushing or joint to be tested.

An advantage with this embodiment is that the testing sequence selected may be tailored according to the specific bushing or joint being tested.

According to yet one embodiment of the invention, the method comprises the method step of updating the vehicle reference database with collected measurement data.

An advantage with this embodiment is that the vehicle reference database from which information is retrieved regarding for example vehicle bushing or joint data, and which data that is used to determine which bushing or joint of a vehicle that needs to be tested and how respective bushing or joint should be tested, continuously can be updated. This may for example provide more accurate predictions of when a specific bushing needs to be replaced.

According to yet another embodiment of the invention, the method step of monitoring behaviour of interaction point of vehicle components, such as for example behaviour of bushing or joint, by means of the means for monitoring, comprises the method step of:
- assessing if a predefined monitoring condition is fulfilled, wherein if the predefined monitoring condition is fulfilled the monitoring is initiated.

In order to test a specific bushing or joint it may be desirable that a predefined monitoring condition is fulfilled before the monitoring, thus also the collection of measurement data, is initiated. It may for example be desirable that the vehicle is set to rock from side to side, by synchronously moving the vehicle wheel supports from side to side in pace with movements of the vehicle, before the testing sequence is started and the monitoring is initiated. This may enable a bushing or a joint to be stress tested by moving the vehicle wheel supports in a direction opposite the rocking movement of the vehicle. It may for example also be desirable to initiate the monitoring when the wheels are arranged in a certain angle.

Information regarding for example vehicle movements and current steering angle may be accessed from the vehicle control unit. Thus, according to one embodiment of the invention the method further comprises accessing a vehicle control unit in order to retrieve vehicle information in order to determine when a predefined monitoring condition is fulfilled and when the monitoring should be initiated. The vehicle information may for example be provided to the vehicle control unit by an accelerometer or a steering angle sensor.

Initiating the monitoring when a predefined monitoring condition is fulfilled has the advantage that it is ensured that what is monitored is the actual determined testing sequence, which is selected based on the bushing or joint that should be monitored, and that no unnecessary monitoring, i.e. collection of irrelevant data, is performed.

According another embodiment of the invention the method step of controlling movement of respective vehicle wheel support individually in at least a first direction in the horizontal plane according to the selected testing sequence also comprises the step of:
- controlling movement of respective vehicle wheel support in a second direction in the horizontal plane according to the selected testing sequence.

According to yet another embodiment of the invention the method step of controlling movement of respective vehicle wheel support in the first and/or a second direction in the horizontal plane according to the selected testing sequence comprises the step of, for respective vehicle wheel support, controlling:
- direction of movement, and/or
- force applied in the direction of movement, and/or
- length of stroke of movement.

In the most basic form of the invention the method comprises controlling direction of movement of the vehicle wheel supports in at least one direction in the horizontal plane, wherein the direction in the horizontal plane in which the movements of the vehicle wheel supports are controllable may be either longitudinally or laterally which reference to the direction of the vehicle. Controlling the movements in two directions in the horizontal plane, i.e. longitudinally and laterally, significantly improves the useability and applicability of the vehicle test apparatus. For testing certain bushings or joint being able to move the vehicle wheel supports laterally may be preferred, for certain bushings or joints being able to move the vehicle wheel supports longitudinally may be preferred. By controlling the movements of the vehicle wheel supports both in longitudinal and lateral direction it is also possible to control the movements diagonally. Being able to control movements both laterally, longitudinally and diagonally is for many applications the most preferred embodiment. The force applied in the direction of movement and the length of stroke of movement is preferably also controllable. The force applied together with the resistance of the movement determines the speed of the vehicle wheel supports, and by controlling how long a specific movement in a specific direction is, i.e. length of stroke, the risk of damaging the vehicle is significantly reduced.

A testing sequence of a specific interaction point of vehicle components such as a bushing or joint is preferably defined in: sequence of movements, direction of respective movement, force applied in respective movement and length of stroke of respective movement. Thus, according to one embodiment of the invention a testing sequence of a bushing defines:

sequence of movements, and/or
direction of respective movement, and/or
force applied in respective direction of movement, and/or
length of stroke of respective movement.

According to yet one embodiment of the invention the movements of respective vehicle wheel supports are individually controllable, wherein the method comprises the method step of controlling movement of respective vehicle wheel supports individually in at least a first direction in the horizontal plane according to the selected testing sequence.

Being able to control the vehicle wheel supports individually, which enables that the vehicle wheel supports can be moved in different, for example opposite, directions in the horizontal plane, has the advantage that a bushing or joint can be exposed to forces or movements which otherwise would not be possible. This enables that more versatile and possibly more accurate testing sequences can be designed which exposes bushings and/or a linkages to loads or forces even better revealing the play due to wear.

According to another embodiment of the invention the test apparatus control unit is connectable to a vehicle control unit wherein the method comprises the method steps of:

accessing vehicle data of the vehicle control unit, and
correlating vehicle data with collected measurement data.

This embodiment of the invention has the advantage that by correlating measurement data collected by using the vehicle test apparatus with vehicle data it may be possible to better detect, predict and interpret vehicle, bushing or joint behaviour. It may for example be possible to correlate bushing breakdown to a specific vehicle parameter, which can be used to predict when a bushing needs to be replaced.

A second aspect of the invention refers to a test apparatus. The vehicle test apparatus comprises:

a test apparatus control unit,
at least one vehicle wheel support, movable in a horizontal plane, and
means for monitoring vehicle bushings or joints, wherein the vehicle wheel supports and the means for monitoring are controllable by means of the test apparatus control unit. The test apparatus control unit is configured to execute a method comprising the steps of:

determining interaction point of vehicle components such as bushing or joint to be tested, and the following steps performed by means of the test apparatus control unit:

selecting testing sequence based on determined interaction point of vehicle components such as bushing or joint to be tested,
controlling movement of the vehicle wheel support in at least a first direction in the horizontal plane according to the selected testing sequence,
monitoring interaction point of vehicle components such as bushing or joint behaviour by means of the means for monitoring, and
collecting measurement data from the means for monitoring.

An advantage with using a vehicle test apparatus according to the invention, for executing a method according to the invention, is that respective interaction point of vehicle components such as bushing or joint is tested according to a testing sequence which guarantees that possible play is revealed and that the testing sequence does not damage the vehicle or components related thereto.

The method step of determining interaction point of vehicle components such as bushing or joint to be tested can be performed either by manually inputting vehicle information, or other information identifying which interaction point of vehicle components such as bushing or joint that needs to be tested, into the test apparatus control unit or by automatically determining interaction point of vehicle components such as bushing or joint to be tested in accordance to any one of the embodiments of methods presented above.

The method may also comprise a method step of evaluating collected measurement data. The method step of evaluating collected measurement data can be performed either manually or automatically.

According to one embodiment of the invention the vehicle test apparatus comprises two vehicle wheel supports. A vehicle test apparatus with two vehicle wheel supports has the exemplary advantage that for example the front wheels of the vehicle for which bushings or joints are to be tested can be moved synchronously. Also, as previously has been disclosed, being able to control movements of both front wheels provides a better control of the forces that the vehicle and wheel suspension is exposed to.

According to a further embodiment of the invention, the vehicle wheel supports comprises rollers configured for testing the brakes of a vehicle. An advantage with this embodiment is that the breaking performance may be evaluated at the same time as vehicle bushings or joints are tested and that also breaking of at least one wheel can be used as a further parameter when designing a suitable testing sequence. As stated herein the vehicle wheel supports are movable in the horizontal plane. However, the vehicle wheel supports themselves may be slightly tilted in relation to the horizontal plane.

According to a first embodiment of this aspect of the invention the movements of respective vehicle wheel support are controllable in terms of:

direction of movements in at least a first direction in the horizontal plane, and/or
force applied in direction of movement, and/or
length of stroke of movement.

As previously stated, an advantage with this embodiment is that it enables bushings or joints to be tested according to a tailored testing sequence and the risk of damaging the vehicle or any component thereof can be reduced.

According to another embodiment the means for monitoring may be at least one from a list of: a video recording device, and/or a wheel alignment sensor, and/or a vibration sensor, and/or a wheel positioning sensor.

What type of sensor that is used affects what data that can be collected by the means for monitoring and how the collected data can be used in order to evaluate the condition of the bushing or joint. An advantage of using monitoring means in form of a video recording device when collecting measurement data is that in most situations a visual recording provides reliable and unambiguous information regarding the condition and behaviour of the bushing or joint, especially if being compared to reference data or reference recording. The recording can also be looked at many times and the assessment does not have to be based on instantaneous behaviour, like when a vehicle test apparatus operator makes the assessment. Use of a video recording device further has the advantage that the recording can be used to visually show the owner or user of the vehicle the condition of a bushing, i.e. can be used as support for recommendations given. Wheel alignment sensors, vibration sensors and wheel positioning sensors are all useful as means for monitoring if the method comprises at least partially automatized evaluation of if a bushing or joint fulfils certain requirements and/or should be replaced or repaired. For some embodiments a combination of more than one of the exemplary means for monitoring are preferable since that provides a larger amount of collected measurement data and possibly more reliable grounds for evaluation and making recommendations.

The invention also refers to a computer program comprising program code means for performing the steps of any one of, or a combination of, embodiments of the invention when said program is run on a computer, to a computer readable medium carrying a computer program comprising program code means for performing the steps of any one of, or a combination of, embodiments of the invention when said program product is run on a computer, and to a test apparatus control unit for execution of a method for evaluating a bushing or joint, the test apparatus control unit being configured to perform the steps of the method according to any one of, or a combination of, embodiments of the invention.

Further advantages and advantageous features of the invention are disclosed in the following description and in the dependent claims.

The terminology used herein is for the purpose of describing particular examples only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles and exemplary embodiments of realizing or controlling operation of the invention. However, the invention should be regarded as illustrative rather than restrictive, and not as being limited to the particular examples discussed above. The different features of the various examples of the invention can be combined in other combinations than those explicitly described. It should therefore be appreciated that variations may be made in those examples by those skilled in the art without departing from the scope of the invention as defined by the following claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

The following description of exemplary embodiments of the invention is presented only for purposes of illustration and should not be seen as limiting. The description is not intended to be exhaustive and modifications and variations are possible in the light of the above teachings, or may be acquired from practice of various alternative embodiments of the invention. The exemplary embodiments discussed herein were chosen and described in order to explain the principles and the nature of various embodiments and its practical application to enable one skilled in the art to utilize the exemplary embodiments in various manners, and with various modifications, as are suited to the particular use contemplated. It should be appreciated that the aspects presented herein separately may be practiced in any combination with each other unless otherwise explicitly is stated.

As previously disclosed, the various embodiments of methods of the invention and various embodiments of vehicle test apparatuses of the invention are suitable for testing and evaluating various interaction points of vehicle components. However, for reason of clarity, when hereinafter disclosing exemplary embodiments of the invention in relation to FIGS. 1A, 1B, 2, 3 and 4 we primarily refer to interaction points of vehicle components in the form of bushings or joints. However, the embodiments of the invention may also be realized for other interaction points such as for example for the engine suspension, engine bearers or leaf spring assembly retainer packs.

Figure 1A:
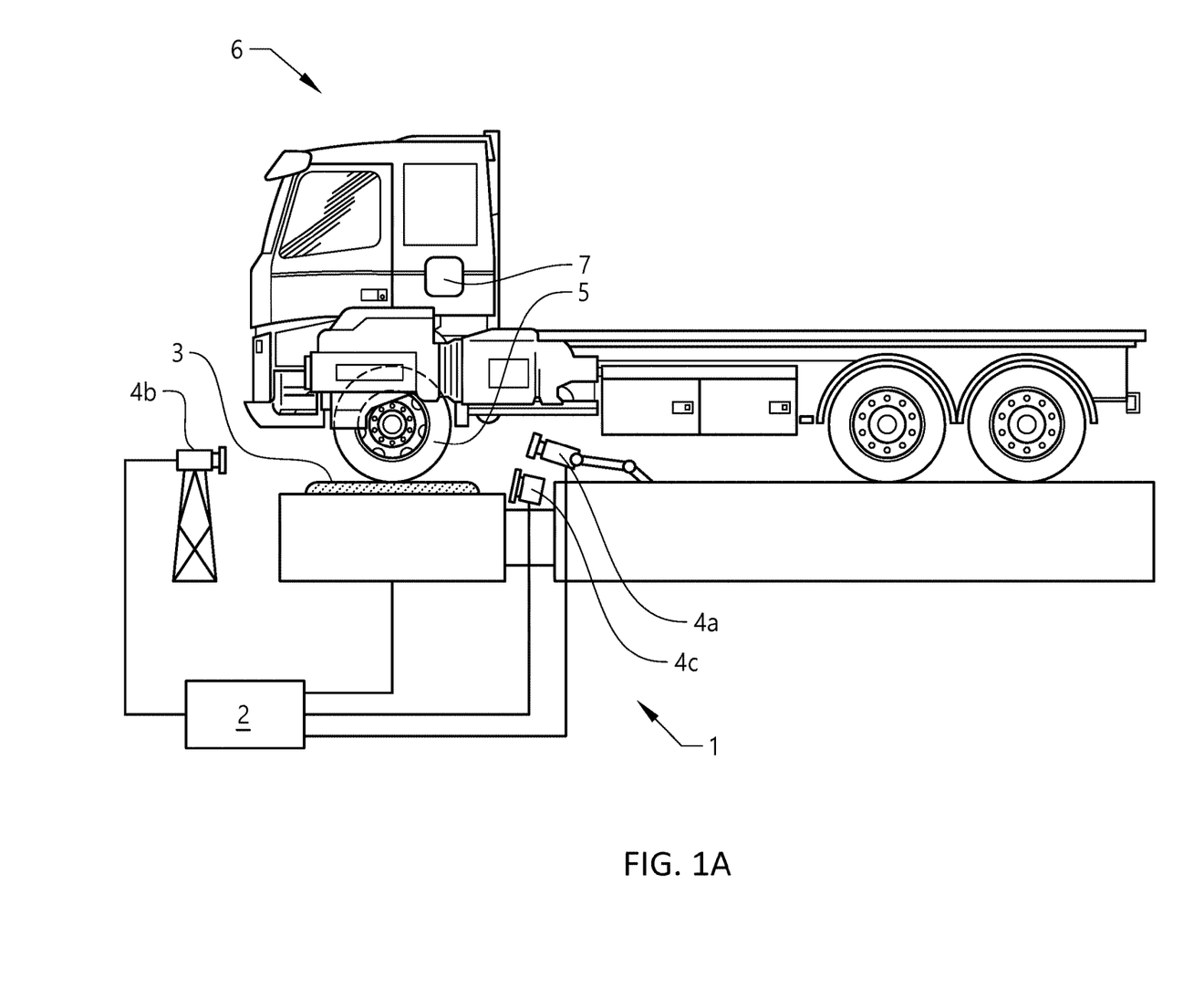
FIG. 1A shows a schematic side view of a vehicle positioned on an exemplary embodiment of a vehicle test apparatus according to the invention.

FIG. 1A shows a schematic side view of a vehicle 6 positioned with its front wheels 5 on an exemplary embodiment of a vehicle test apparatus 1 according to the invention. The vehicle test apparatus 1 comprises a test apparatus control unit 2, a vehicle wheel support 3 and means for monitoring vehicle bushings or joints 4. In FIG. 1A various examples of means for monitoring 4 are exemplified, more particularly a video recording device 4a, wheel alignment sensors 4b and a wheel positioning sensor 4c. These are non-exhaustive examples of means for monitoring which can be used singularly or in combination. Also other sensors, such as for example vibration sensors, can be used as means for monitoring.

Bushings of linkages, wheel suspensions etc. of vehicles are exposed to wear. In order to identify wear, i.e. the play that ultimately is the result of the wear, moveable plates can be used. By manually controlling the movements of the plates, which is the only available method today, and visually monitoring the behaviour of respective bushing the condition of the bushing can be assessed. The properties of respective bushing is determined by for example the position of the bushing and the construction of respective bushing or the suspension, linkage etc. in which the bushing is arranged. Thus, respective bushing needs to be exposed to specific forces and movements in order to be able to evaluate the condition of that specific bushing. Evaluating the condition of a bushing by visually monitoring respective bushing makes the assessment fairly arbitrary. Also, by manually moving the plates there is an imminent risk that the testing sequence used is insufficient, not reproducible and/or that linkages, wheel suspensions etc. may get damaged during testing.

According to the invention a vehicle test apparatus may be realized comprising one, two or possibly even more movable vehicle wheel supports. The vehicle wheel supports are configured for receiving at least one wheel of a vehicle for which a bushing or a joint should be tested and evaluated. Although the invention herein first and foremost is described with respect to that it is the front wheels of the vehicle that are positioned or arranged on the vehicle wheel supports it is also possible to arrange the most rear pair of wheels of a vehicle on the vehicle wheel supports. For embodiments of a vehicle test apparatus according to the invention comprising more than two vehicle wheel supports more than just two wheels may be positioned or arranged on vehicle wheel supports.

In FIG. 1A only one vehicle wheel support 3 is visible. The vehicle wheel support 3 and the means for monitoring 4 are controllable by means of the test apparatus control unit 2. The test apparatus control unit 2 may for example be an external computer device. The vehicle test apparatus 1 is configured to execute a method comprising the method steps of:

manually or automatically determining bushing or joint to be tested, and the following steps performed by means of the test apparatus control unit 2;

selecting testing sequence based on determined bushing or joint to be tested, controlling movement of the vehicle wheel supports in at least a first direction in the horizontal plane according to the selected testing sequence, monitoring bushing or joint behaviour by means of the means for monitoring 4, and collecting measurement data from the means for monitoring 4.

The method may also comprise the step of evaluating collected measurement data. The evaluation may either be done manually, for example by that a vehicle test apparatus operator assesses the data, or automatically, for example by that the test apparatus control unit processes the collected data. However, even if the evaluation is done by manually assessing the measurement data using a testing sequence as according to the invention, wherein the testing sequence is specifically designed to provide sufficient data, the evaluation is based on less arbitrary data. An automated evaluation may be performed by a computer program comprising program code means capable of performing such operation. Since the collected data may vary significantly dependent on which sensor or sensors that are used when collecting measurement data the evaluation of collected measurement data is performed in different ways depending on the source of the collected data. The horizontal plane is defined as being horizontal in relation to the vehicle test apparatus 1.

Thus, an advantage with using a test apparatus according to the invention is that respective bushing or joint is tested according to a testing sequence which is designed to reveal play and that the testing sequence does not damage the vehicle or components related thereto.

Figure 1B:
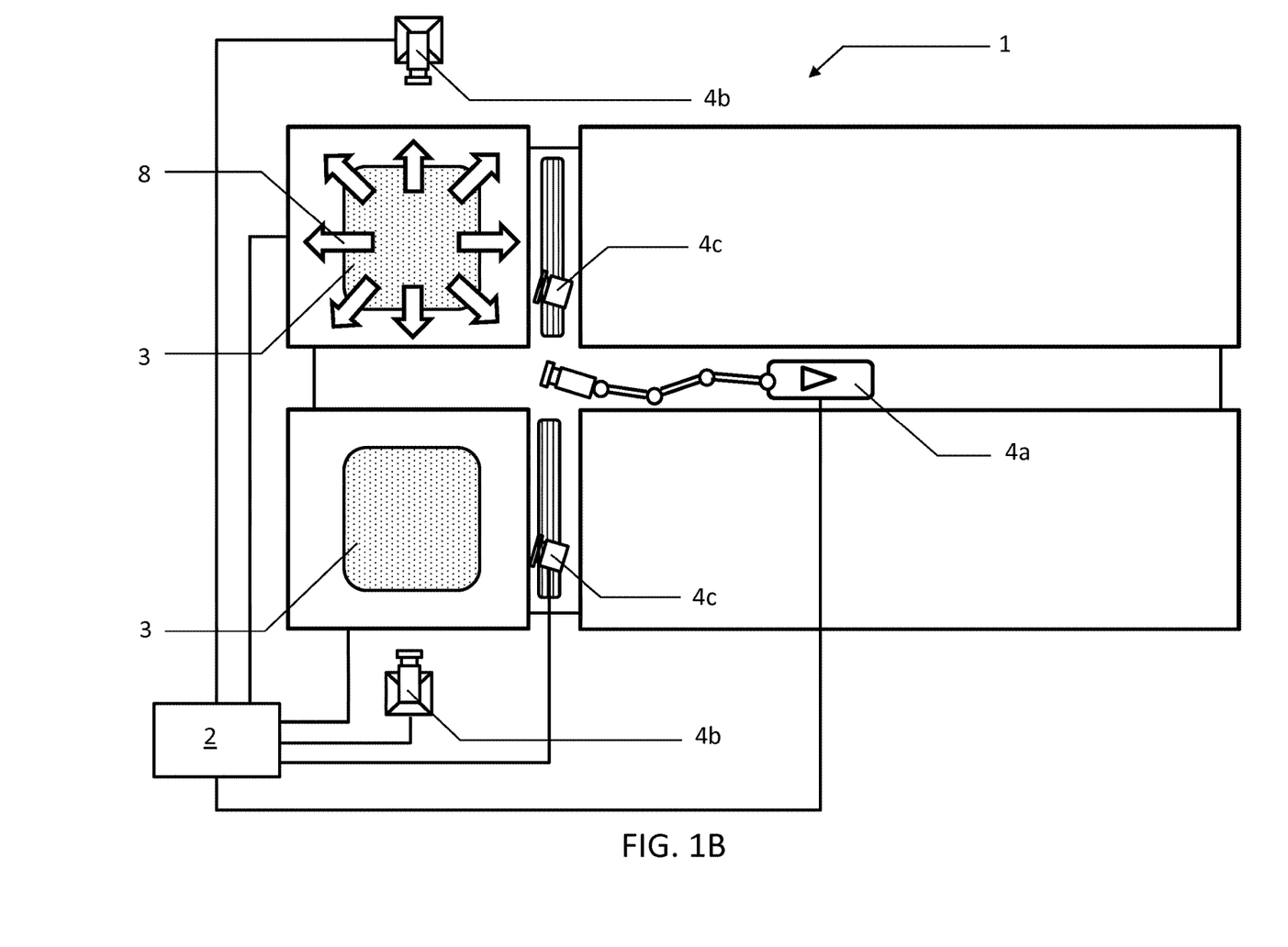
FIG. 1B shows a schematic top view of an exemplary embodiment of a vehicle test apparatus according to the invention.

FIG. 1B shows a schematic top view of an exemplary embodiment of a vehicle test apparatus 1 according to the invention. According to the embodiment of FIG. 1B the vehicle test apparatus 1 comprises two vehicle supports 3 which are moveable in a lateral and/or longitudinal direction, with reference to the extension of the vehicle test apparatus 1, in the horizontal plane. Being moveable in lateral and longitudinal direction also enables the vehicle wheel supports 3 to be moveable diagonally. Possible directions of movement of one of the vehicle wheel supports 3 are indicated by arrows 8 in FIG. 1B. The vehicle wheel supports 3 may be movable individually. According to the invention the movements of respective vehicle wheel support 3 are controllable in: direction of movements in at least a first direction in the horizontal plane, and/or force applied in direction of movement, and/or length of stroke of movement. Thereby the sequence of movements of a testing sequence may be defined in: direction of respective movement and/or force applied in respective direction of movement and/or length of stroke of respective movement.

In FIG. 1B also various examples of means for monitoring 4 is exemplified, more particularly a video recording device 4a, wheel alignment sensors 4b and wheel positioning sensors 4c. This is not an exhaustive list of possible means for monitoring. The test apparatus control unit 2 is connected to the means for monitoring 4 and the vehicle wheel supports 3, whereby the means for monitoring 4 and the vehicle wheel supports 3 are controllable by test apparatus control unit 2.

As can be seen in FIGS. 1A and 1B the vehicle wheel supports 3 are arranged to have an extension in the horizontal plane. However, when herein referring to that the vehicle wheel supports 3 are moved in at least one direction in the horizontal plane this is considered to also comprise that the vehicle wheel supports 3 may be slightly tilted, i.e. having a slightly angled extension in relation to the horizontal plane, but that they still are movable in the horizontal plane.

According to the invention it is also possible to move the vehicle wheel supports 3 in a plane slightly tilted in relation to the horizontal plane. If you divide the force that a wheel 5 is exposed to when being moved by a vehicle wheel support 3 acting at a slightly tilted angle in force components you will get a horizontally directed force component and a vertically directed force component, wherein the horizontally directed force component will be significantly larger than the vertical force component. As long as the force component in horizontal direction is significantly larger than the force component in vertical direction this is still considered to be a movement in the horizontal plane. Thus, the invention is considered to comprise also that the vehicle wheel supports 3 may be moved in a slightly tilted plane. However, moving the vehicle wheel supports 3 in an a vertical direction would not expose the wheel 5, or components arranged to be connected thereto, to forces sufficient for evaluating the condition of bushings or joints according to the methods of the invention.

The reference numerals of FIG. 1A and FIG. 1B will hereinafter also be used when discussing the exemplary embodiments of methods according to the invention disclosed in the flow charts of FIGS. 2 to 5.

Figure 2:
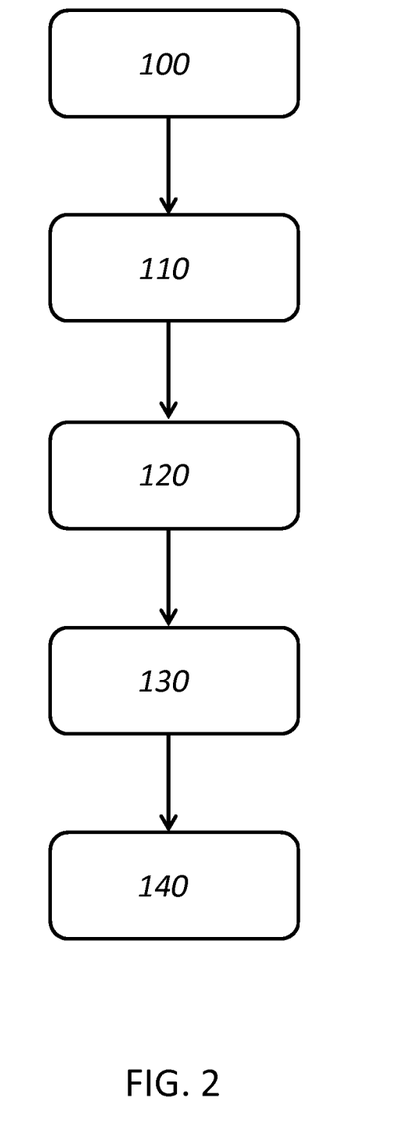
FIG. 2 shows a flow chart over an exemplary embodiment of a method of the invention.

FIG. 2 shows a flow chart over an exemplary embodiment of a method of the invention. The different steps of the method are visualized by boxes in the flow chart. The method is suitable for evaluating bushings or joints by means of a vehicle test apparatus 1, wherein the vehicle test apparatus 1 comprises a test apparatus control unit 2, at least one, preferably two, vehicle wheel supports 3 movable in a horizontal plane, and means for monitoring bushings 4. The vehicle wheel support or supports 3 and the means for monitoring 4 are controllable by means of the test apparatus control unit 2. The method comprises the steps of:

100 manually or automatically determining bushing or joint to be tested, and the following steps performed by means of the test apparatus control unit 2:

110 selecting testing sequence based on determined bushing or joint to be tested,

120 controlling movement of the vehicle wheel supports 3 in at least a first direction in the horizontal plane according to the selected testing sequence,

130 monitoring bushing or joint behaviour by means of the means for monitoring 4, and

140 collecting measurement data from the means for monitoring 4.

An advantage with a method according to the invention is that bushings and joints may be tested according to a testing sequence which guarantees that potential play is revealed and that the testing sequence does not damage the vehicle 6 or components related thereto.

The step of determining bushing or joint to be tested may either be performed by that a test apparatus operator manually selects or enters required information or by an at least partially automated process.

Figure 3:
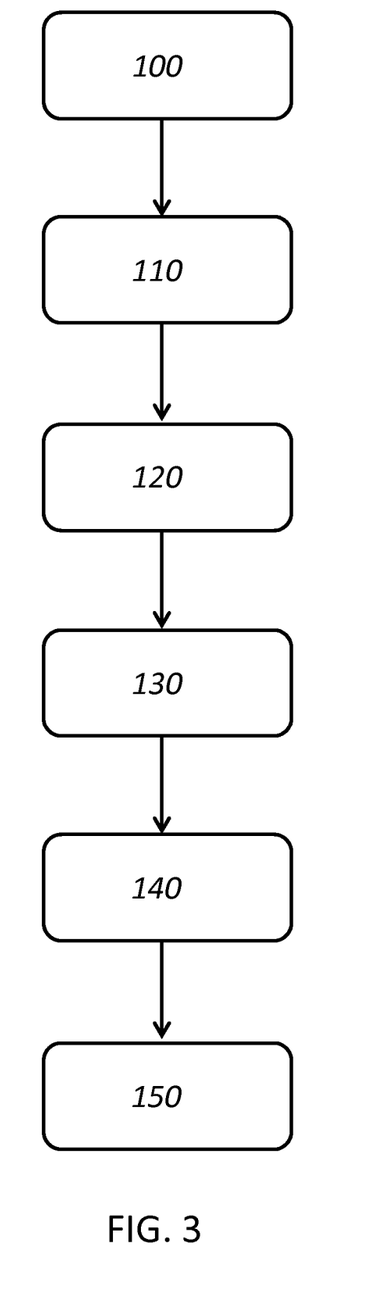
FIG. 3 shows a flow chart over another exemplary embodiment of a method of the invention.

FIG. 3 shows a flow chart over another exemplary embodiment of a method of the invention. The different steps of the method are visualized by boxes in the flow chart. In addition to the method steps disclosed in relation to FIG. 2 the exemplary embodiment of FIG. 3 comprises the further method step of:

150 evaluating collected measurement data.

As previously disclosed, the evaluation of collected measurement data may either be done manually, for example by that a vehicle test apparatus operator assesses the collected measurement data, or automatically, for example by that the test apparatus control unit 2 processes and assesses the collected measurement data. An automated evaluation may be performed by a computer program comprising program code means capable of performing such operation.

Figure 4:
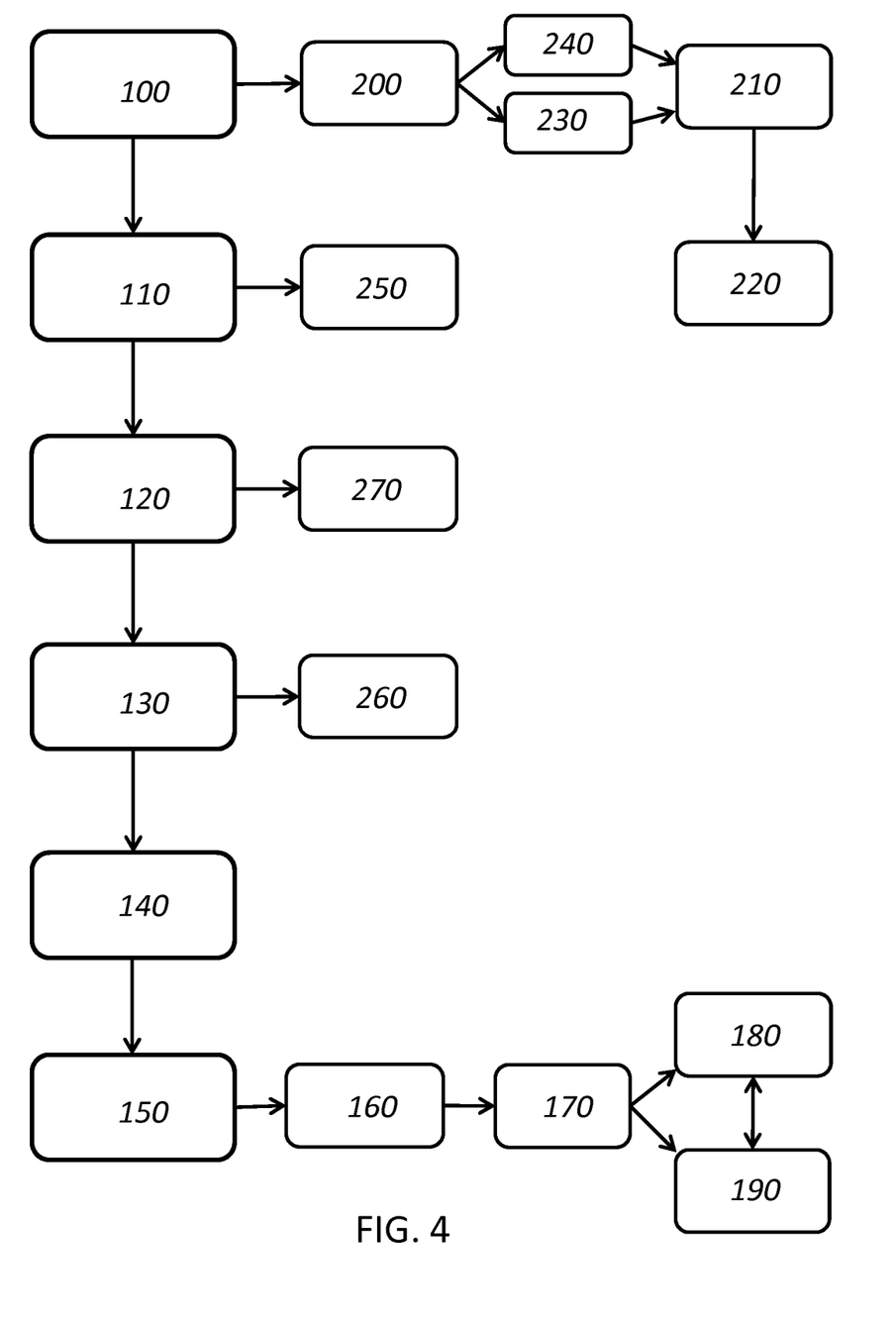
FIG. 4 shows a flow chart over yet other exemplary embodiments of methods of the invention.

FIG. 4 shows a flow chart over yet other exemplary embodiments of methods of the invention. The different steps of the methods are visualized by boxes in the flow chart. The exemplary embodiment disclosed in FIG. 4 comprises the method steps disclosed in relation to FIG. 2 and FIG. 3. Additionally an exemplary embodiment of FIG. 4 discloses that the method step of:

150 evaluating collected measurement data, comprises the further the method step of:

160 accessing a vehicle reference database comprising stored data.

The data from the vehicle reference database, which for example may be a database provided by a vehicle or component manufacturer or a database based on vehicle data previously collected, may be used to perform the further method steps of:

170 comparing collected measurement data with stored bushing data, whereby the method step of:

180 manually or automatically determining if a vehicle bushing or joint fulfils vehicle requirements, and/or the method step of:

190 manually or automatically determining if a vehicle bushing needs to be replaced, can be performed.

Thus, comparing collected measurement data with stored data from a vehicle reference database has the advantage that the assessment may be less arbitrary. The comparison can be done either manually, by a vehicle test apparatus operator, or automatically by a computer program comprising program code means capable of performing such operation. The results from the comparison may for example be used to either determine if a bushing fulfils certain requirements or to determine if a bushing needs to be replaced.

Requirements which have to, or at least preferably should, be fulfilled may for example be set by the owner or user of the vehicle or be set by legislation. The requirements may for example be dependent on the application of the specific vehicle. If a set requirement is not fulfilled this may lead to that it is determined that a specific bushing needs to be replaced or that a joint needs to be attended to, for example that maintenance service is required.

An exemplary embodiment of FIG. 4 further discloses that the method step of:

100 manually or automatically determining bushing or joint to be tested, comprises the steps of

200 accessing a vehicle reference database comprising stored data connected to vehicle information,

210 inputting vehicle information, and

220 retrieving stored data based on inputted vehicle information.

According to the invention one exemplary way of determining which bushing or joint that needs to be tested is thus to access a vehicle reference database. That database may for example comprise information regarding different vehicle models, preferably linked to specific parameters such as for example weight, or different bushing or joint models. The database may further comprise for example information regarding how, when and under what circumstances a certain bushing or joint usually is worn. It may also comprise information regarding if a certain usage of a vehicle wears more or less on a specific bushing or vehicle. By entering vehicle information, wherein vehicle information for example may be weight of vehicle, serial number of vehicle or model year, relevant data can be retrieved from the vehicle reference database accessed. The step of 210 inputting vehicle information may be performed either by

230 automatically detecting vehicle model and/or vehicle weight and/or vehicle individual and/or mileage of a vehicle and/or vehicle application of the vehicle, whereby vehicle information is inputted, or

240 manually inputting vehicle information.

Automated detection of which vehicle individual, which vehicle model etc. may be more or less complex. Automated detection of a vehicle model just by weight is fairly simple and is more or less only dependent on having a properly working vehicle weighing machine, whereas for example use of automated visual vehicle plate reading is more complex. Also other methods of automatically detecting vehicle model, vehicle individual etc. are feasible. Inputting the vehicle information manually also has advantages.

Entering vehicle information manually is for example not dependent on that a sensor is required to work as expected.

An exemplary embodiment of FIG. 4 also discloses that the method step of:

110 selecting testing sequence based on determined bushing or joint to be tested, comprises the step of:

250 determining type of bushing or joint and/or position of bushing or joint to be tested.

The testing sequence selected is preferably selected dependent on which busing or joint that should be tested. Thereby it can be assured that a testing sequence designed to specifically expose wear, or play due to wear, for that specific bushing or joint is selected. A certain testing sequence may be designed according to one specific busing or joint, to a number of bushings and/or joints or for a specific component. Each testing sequence may also be designed according to specific vehicle parameters such as that the steering linkage should be set at a certain steering angle.

An exemplary embodiment of FIG. 4 also discloses that the method step of:

130 monitoring bushing or joint behaviour by means of the means for monitoring 4, comprises the method step of:

260 assessing if a predefined monitoring condition is fulfilled, wherein if the predefined monitoring condition is fulfilled the monitoring is initiated. For testing of certain bushings and/or joints it may be desirable that the monitoring is not initiated at the start of the testing sequence, but after the testing sequence for example has set the vehicle in motion. The predefined monitoring condition may for example also be that the testing sequence should have been ongoing for a certain time. A bushing may for example be temporarily clogged by dried mud and dirt and may move freely, whereby play can be revealed, first after the dried mud and dirt have been removed. Waiting a few seconds with collecting measurement data may reduce the risk of that irrelevant data is collected.

An exemplary embodiment of FIG. 4 further discloses that the method step of:

120 controlling movement of respective vehicle wheel support 3 in at least a first direction in the horizontal plane according to the selected testing sequence, also comprises the step of:

270 controlling movement of respective vehicle wheel support 3 in a second direction in the horizontal plane according to the selected testing sequence, wherein what is controlled is direction of movement, and/or force applied in the direction of movement, and/or length of stroke of movement.

The movements of respective vehicle wheel support 3 can be controlled either individually or synchronously.

The method for evaluating bushings by means of a vehicle test apparatus 1 according to the invention may also comprise updating the vehicle reference database with collected measurement data. Also, the method may comprise accessing vehicle data of a vehicle control unit 7, see FIG. 1A, and correlating vehicle data with collected measurement data.

It should be emphasized that FIG. 4 discloses various embodiments of methods according to the invention which may be, but is not limited to be, performed when realizing the invention. An embodiment of a method according to the invention does not have to comprise all method steps disclosed in relation to FIG. 4.

Although FIGS. 2 to 4 show a specific order of the method steps, the order of the steps may differ from what is depicted or at least various method steps may be performed simultaneously or partially simultaneously.

When herein referring to a control unit what is considered is a device capable of performing calculations, executing methods and performing operations. The control unit may for example be a general-purpose processor, an application specific processor, a circuit containing processing components, a group of distributed processing components or a group of distributed computers devices. The control unit may be a part of a larger unit capable of controlling also other devices and functionalities. The control unit may be configured to control the devices and the functionalities explicitly stated herein, but is not limited to only controlling those devices and/or functionalities. In addition to the components and/or devices the control unit explicitly is connected to the control unit may also be connected to other components and/or devices.

It is to be understood that the invention is not limited to the embodiments described above and illustrated in the drawings; rather, the skilled person will recognize that many changes and modifications may be made within the scope of the appended claims. Thus, variations of the disclosed embodiments can be understood by the skilled person.

The invention claimed is:

1. A method for testing behaviour of interaction points of vehicle components by a vehicle test apparatus comprising a test apparatus control unit, a vehicle wheel support movable in a horizontal plane, and a monitor, the vehicle wheel support and the monitor controllable by the test apparatus control unit, the method comprises:
   identifying, at the test apparatus control unit, vehicle model and interaction point to be tested, the interaction point comprising a bushing or joint arranged between interacting vehicle components;
   providing, to the test apparatus control unit, a set of testing sequences, each testing sequence defining a sequence of movements of the vehicle wheel support and further defining direction of respective movement, force applied in respective direction of movement and length of stroke of respective movement, wherein each of the testing sequences is configured to expose a specific bushing or joint, and/or the linkage of that bushing or joint, to loads or forces defined in direction, magnitude and length of stroke which are sufficient for revealing a play due to wear at that specific bushing or joint; and
   selecting, by the test apparatus control unit, a specific testing sequence based on the identified vehicle model and interaction point to be tested;
   controlling, by the test apparatus control unit, movement of the vehicle wheel support in at least a first direction in the horizontal plane according to the selected specific testing sequence,
   monitoring, by the test apparatus control unit, behaviour of the bearing or joint to be tested by the monitor, and
   collecting, by the test apparatus control unit, measurement data from the monitor.

2. The method of claim 1, wherein the monitor is a video recording device and the behaviour of the bearing or joint is monitored by monitoring play at the etermined video recording device.

3. The method of claim 1, wherein the method further comprises evaluating collected measurement data.

4. The method of claim 3, wherein the method further comprises:
   accessing a vehicle reference database comprising stored reference data; and comparing collected measurement data with stored reference data.

5. The method of claim 3, wherein the method further comprises:
   determining if the tested bushing or joint fulfils vehicle requirements.

6. The method of claim 3 further comprising
   determining if a vehicle bushing needs to be replaced.

7. The method of claim 1, wherein the identifying vehicle model and interaction point to be tested comprises:
   accessing a vehicle reference database comprising stored data connected to vehicle information;
   inputting vehicle information; and
   retrieving stored data based on inputted vehicle information.

8. The method of claim 7, wherein the inputting vehicle information is performed by one of:
   automatically detecting at least one of vehicle model, vehicle weight, vehicle individual, mileage of a vehicle, or vehicle application of the vehicle; or
   manually inputting vehicle information.

9. The method of claim 1, wherein the monitoring behaviour of the bearing or joint by the monitor further comprises assessing if a predefined monitoring condition is fulfilled, wherein if the predefined monitoring condition is fulfilled the monitoring is initiated.

10. The method of claim 1, further comprising updating a vehicle reference database with collected measurement data.

11. The method of claim 1, wherein the method further comprises controlling movements of both vehicle wheel supports of the vehicle test apparatus in at least a first direction in the horizontal plane according to the selected specific testing sequence.

12. The method of claim 1, wherein the controlling movement of the vehicle wheel support in at least a first direction in the horizontal plane according to the selected specific testing sequence further comprises controlling movement of the vehicle wheel support in a second direction in the horizontal plane according to the selected specific testing sequence.

13. The method of claim 1, wherein the controlling movement of the vehicle wheel support in at least a first direction in the horizontal plane according to the selected testing sequence, comprises controlling at least one of:
   direction of movement;
   force applied in the direction of movement; or
   length of stroke of movement.

14. The method of claim 13, wherein a testing sequence is defined in at least one of:
   sequence of movements;
   direction of respective movement;
   force applied in respective direction of movement; or
   length of stroke of respective movement.

15. The method of claim 1, wherein the test apparatus control unit is connectable to a vehicle control unit, the method further comprising:
   accessing vehicle data of the vehicle control unit; and
   correlating vehicle data with collected measurement data.

16. A vehicle test apparatus for testing behaviour of a bushing or joint arranged between interacting vehicle components, the vehicle test apparatus comprises:
   a test apparatus control unit
   a vehicle wheel support movable in a horizontal plane; and
   a monitor,
   wherein the vehicle wheel support and the monitor are controllable by the test apparatus control unit, and
   wherein the test apparatus control unit is configured to:
      select, based on an identification of vehicle model and which bearing or joint to be tested, a specific testing sequence for the bearing or joint to be tested, wherein a set of testing sequences is provided, each testing sequence defining a sequence of movements of the vehicle wheel support and further defining direction of respective movement, force applied in respective direction of movement and length of stroke of respective movement, wherein each of the testing sequences is designed to expose a specific bushing or joint, and/or the linkage of that bushing or joint, to loads or forces defined in direction, magnitude and length of stroke which are sufficient for revealing a play due to wear at that specific bushing or joint;
      control movement of the vehicle wheel support in at least a first direction in the horizontal plane according to the selected specific testing sequence;
      monitor behaviour of the bearing or joint by the monitor; and
      collect measurement data from the monitor.

17. The vehicle test apparatus of claim 16, wherein the movements of the vehicle wheel support are controllable in terms of at least one of:
   direction of movements in at least a first direction in the horizontal plane;
   force applied in direction of movement; or
   length of stroke of movement.

18. The vehicle test apparatus of claim 16, wherein the monitor may be at least one of:
   a video recording device;
   a wheel alignment sensor;
   a vibration sensor; or
   a wheel positioning sensor.

19. The vehicle test apparatus of claim 16, wherein the monitor is a video recording device.

* * * * *